(12) United States Patent
Moallem et al.

(10) Patent No.: US 8,078,800 B2
(45) Date of Patent: Dec. 13, 2011

(54) DYNAMIC OPERATING POINT MODIFICATION IN AN INTEGRATED CIRCUIT

(75) Inventors: Maziar H. Moallem, Cupertino, CA (US); Sanjay Mansingh, Santa Clara, CA (US); Richard F. Avra, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 412 days.

(21) Appl. No.: 12/479,063

(22) Filed: Jun. 5, 2009

(65) Prior Publication Data

US 2010/0312971 A1    Dec. 9, 2010

(51) Int. Cl.
*G06F 12/00* (2006.01)
(52) U.S. Cl. ........................................................ 711/118
(58) Field of Classification Search .................. None
See application file for complete search history.

(56) References Cited

U.S. PATENT DOCUMENTS

| | | | |
|---|---|---|---|
| 6,717,687 B2 * | 4/2004 | Nagata | 358/1.13 |
| 7,099,569 B2 * | 8/2006 | Gadre et al. | 386/230 |
| 7,500,164 B2 | 3/2009 | Chelstrom et al. | |
| 7,634,698 B2 | 12/2009 | Wang | |

* cited by examiner

*Primary Examiner* — Hiep Nguyen
(74) *Attorney, Agent, or Firm* — Lawrence J. Merkel; Meyertons, Hood, Kivlin, Kowert & Goetzel, P.C.

(57) ABSTRACT

In one embodiment, an integrated circuit includes a processor, an internal memory, and a memory controller coupled to an external memory. The integrated circuit may support two or more modes of operation, with different operating points. To switch from one operating point to another, code executed by the processor may copy switch code from the external memory into the internal memory, and may jump to the switch code. Executing out of the internal memory, the switch code may communicate with the memory controller to cause the external memory to enter into self-refresh mode. The operating point may be altered, and the switch code may reinitialize the memory controller after the integrated circuit has stabilized at the new operating point. After the memory controller's physical interface circuit has relocked, the external memory may exit self-refresh mode.

22 Claims, 3 Drawing Sheets

DYNAMIC OPERATING POINT MODIFICATION IN AN INTEGRATED CIRCUIT

BACKGROUND

1. Field of the Invention

This invention is related to systems including integrated circuits and external memory accessible to the integrated circuits, and to dynamically changing operating points in such systems.

2. Description of the Related Art

As the number of transistors included on an integrated circuit "chip" continues to increase, power management in the integrated circuits continues to increase in importance. Power management can be critical to integrated circuits that are included in mobile devices such as personal digital assistants (PDAs), cell phones, smart phones, laptop computers, net top computers, etc. These mobile devices often rely on battery power, and reducing power consumption in the integrated circuits can increase the life of the battery. Additionally, reducing power consumption can reduce the heat generated by the integrated circuit, which can reduce cooling requirements in the device that includes the integrated circuit (whether or not it is relying on battery power).

One way to provide for power management is to support modes in an integrated circuit in which different clock frequencies, supply voltages, and other power management settings can be used based on the activity that is occurring in the integrated circuit. However, switching between modes can be very complex, and the complexity can increase with increased complexity of the integrated circuits. In many cases, switching between modes can involve resetting the integrated circuit to ensure that the integrated circuit can operate correctly at the new clock frequency.

SUMMARY

In one embodiment, an integrated circuit includes a processor, an internal memory, and a memory controller configured to couple to an external memory that is not part of the integrated circuit. The integrated circuit may support two or more modes of operation, and the operating point in at least some of the modes may be different from the operating points in other modes. To switch between modes having different operating points, code executed by the processor may copy switch code from the external memory into the internal memory, and may jump to the switch code. Executing out of the internal memory, the switch code may communicate with the memory controller to cause the external memory to enter into self-refresh mode to preserve the contents of the external memory. The operating point may be changed, and the switch code may reinitialize the memory controller after the integrated circuit has stabilized at the new operating point. After the memory controller's physical interface circuit has relocked, the external memory may exit self-refresh mode.

In an embodiment, the switch code (and the operation of related code executed out of the external memory before and after the switch code) may provide reliable switching between modes having different operating points. The switch code may be used, e.g., during testing of the integrated circuit. By providing a reliable mechanism to switch between modes, the switch code can ensure that failures detected in the test are failures of the integrated circuit and not failures occurring due to unreliable attempts to switch between modes. In another embodiment, the switch code may be used with the integrated circuit in an end product (e.g. a mobile device) to reliably switch between modes on the fly (e.g. without a reset of the device or the integrated circuit). For example, the contents of the external memory may be preserved, allowing the integrated circuit to continue operation from its most recent state after the mode change.

BRIEF DESCRIPTION OF THE DRAWINGS

The following detailed description makes reference to the accompanying drawings, which are now briefly described.

Figure 1:
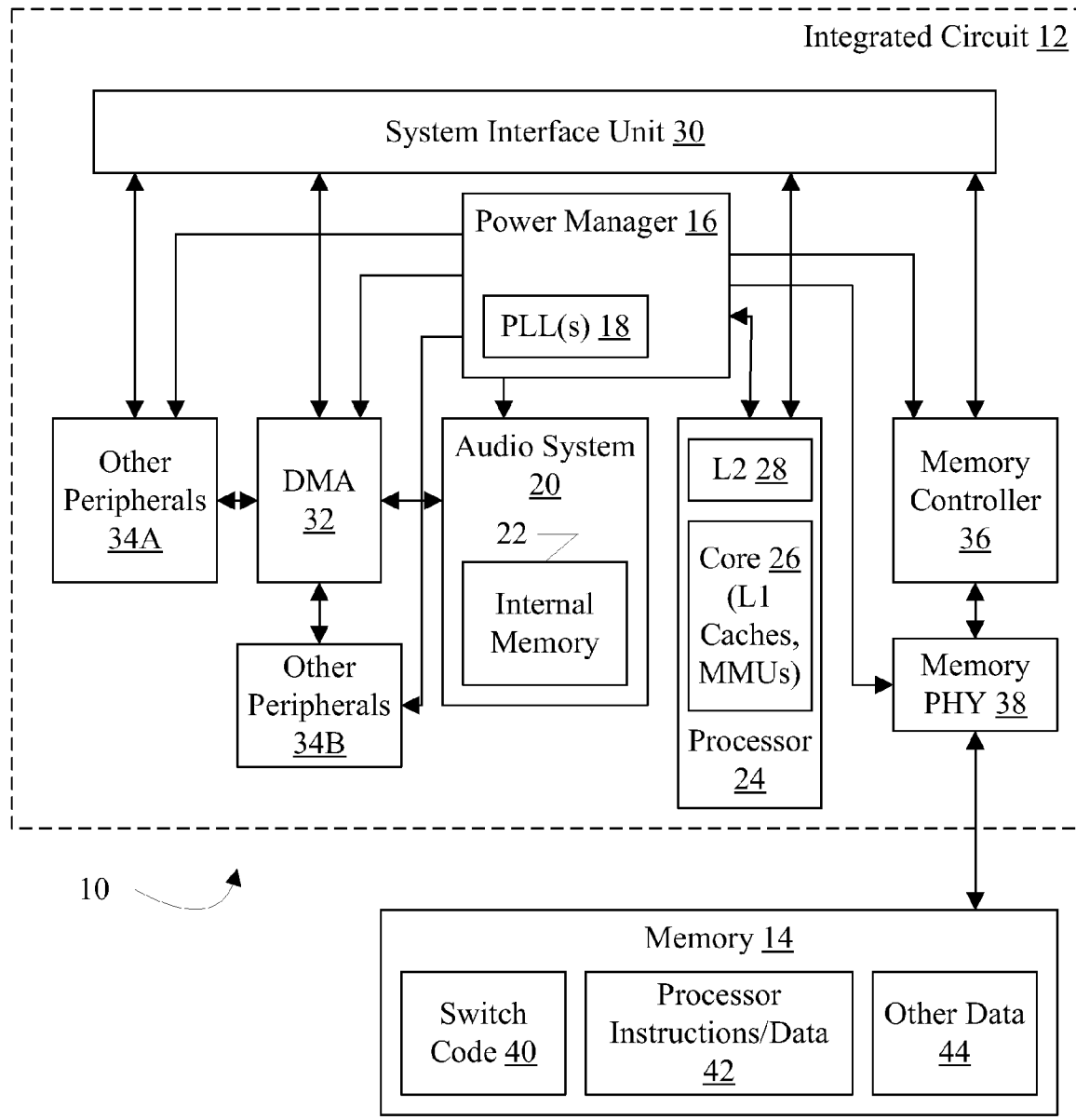
FIG. 1 is a block diagram of one embodiment of a system including an integrated circuit and external memory.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of a system 10 is shown. In the embodiment of FIG. 1, the system 10 includes an integrated circuit 12 coupled to an external memory 14. In the illustrated embodiment, the integrated circuit 12 includes a power manager unit 16 which includes one or more phase locked loops (PLLs) 18, an audio system 20 which includes an internal memory 22, a processor 24 which includes a processor core 26 and an L2 cache 28, a system interface unit (SIU) 30, a direct memory access (DMA) unit 32, one or more other peripherals 34A-34B, a memory controller 36, and a memory physical interface circuit (PHY) 38.

The peripherals 34A, the DMA unit 32, the processor 24, and the memory controller 36 are coupled to the system interface unit 30. In some embodiments, the system interface unit 30 may be hierarchical (in which some components may be coupled to local interface units that serve as a bridge to the system interface unit 30). In other embodiments, the system interface unit 30 may be the only level of interface. The DMA unit 32 is coupled to the peripherals 34A-34B and to the audio system 20. The memory controller 36 is coupled to the memory PHY 38, which is coupled to the external memory 14. The power manager 16 is coupled to the peripherals 34A-34B, the DMA unit 32, the audio system 20, the processor 24, the memory controller 36, the memory PHY 38, and the system interface unit 30 to provide clocks to the circuitry therein. The clocks may have various frequencies derived from the PLLs 18. Additionally, the processor 24 may communicate with the power manager 16 (e.g. to select different modes for the integrated circuit 12). Various peripherals 34A-34B and/or the audio system 20 may be coupled to external devices such as video display devices, other user interface devices such as speakers, microphone, etc., radio hardware for wireless interfaces, etc. In one embodiment, the integrated circuit is referred to as a system-on-a-chip (SOC). In some embodiments, the external memory 14 may be packaged with the integrated circuit 12 (e.g. in a package-on-package configuration or a chip-on-chip configuration. Generally, the integrated circuit 12 may be integrated onto a single semiconductor substrate. In other embodiments, two or more integrated circuits may be employed to provide the components of the circuit 12 illustrated in FIG. 1.

The power manager 16 may be configured to control the operating point of the integrated circuit 12. The operating point may include, for example, one or more of the operating frequency of the integrated circuit 12, the supply voltage of the integrated circuit 12, and/or various power management settings. The power management settings may include any settings that regulate the power consumption of the integrated circuit 12 or components of the integrated circuit 12. For example, the power management settings may include one or more of clock gating, power gating, sleep modes for a component, etc. Clock gating may include temporarily interrupting the clock to a component (e.g. while it is still powered up), forcing the component idle for one or more clock cycles and thus preventing switching in the component. Power gating may include temporarily interrupting the power supply to the component, powering it down. Sleep modes may be modes at least partially implemented by the component itself, in which the component slows or stops its operation and conserves power. The power manager 16 may control the supply voltage by transmitting requested supply voltage magnitudes to an external power supply. The power manager 16 may control the PLLs 18, and more particularly the operating frequency of the clocks generated by the PLLs 18, to control the operating frequency in the integrated circuit 12. In some embodiments, the PLLs 18 may be bypassed in some modes and may run directly from the input clock. Other power management settings may be controlled in conjunction with the components being managed. An operating frequency for a clock may generally refer to the frequency at which the clock is oscillating. An operating frequency may be referred to as established, herein, if the frequency has been selected for the corresponding clock or clocks, and the clocks have stabilized at the operating frequency. In the case of a PLL, for example, the PLL may need to lock to the frequency. Alternatively, the frequency may be generated by changing a divider or multiplier that is coupled to the output clock of the PLL. Establishing the frequency may include changing the divider or multiplier. Similarly, establishing an operating point may include changing the operating point and waiting for the integrated circuit 12 to stabilize at the new operating point. For example, a changed power supply voltage may stabilize at the new voltage level, or other power management settings may involve time to stabilize at the new value.

The power manager 16 may be configured to control the operating point responsive to monitoring the operation of the integrated circuit 12, receiving commands from the processor 24, receiving external inputs to the integrated circuit 12, and/or any combination of the above. In one embodiment, the power manager 16 may control the operating point in response to a mode change requested by the processor 24 (responsive to instructions executing on the processor 24).

The integrated circuit 12 may be configured to support at least two modes of operation, each having a different operating point. In one exemplary embodiment, an audio mode and a video mode may be supported. The audio mode may be used in a system including the integrated circuit when the system has video devices powered off, for example, but has audio playback occurring through the speakers and/or through headphones or other audio listening devices coupled to the system. The video mode may be used when the video devices are on and thus the system is in full power use. Video processing generally involves higher bandwidth/lower latency processing requirements as compared to audio. Additionally, a user may be significantly more interactive with the system when in video mode than when in audio mode. In some embodiments, higher performance, supported by a higher operating frequency for example, may be implemented in video mode as compared to audio mode. In some embodiments, at least some of the peripherals 34A-34B may be powered off in audio mode. Additionally, in some embodiments, the processor 24 may be in sleep mode unless interrupted by the audio system 20 or a user input attempting to activate video mode.

Specifically, in one embodiment, the integrated circuit 12 may be fully powered up in video mode, although software may be disable various components if the components are idle. In audio mode, the audio system 20, the power manager 16, the processor 24, the memory controller 36, the memory PHY 38, and the external memory 14 may be in operation. The base operating frequency (from which the operating frequencies of the various components listed above may be derived) may be the audio operating frequency, which may be lower than the video operating frequency. In video mode, the base operating frequency may be the video operating frequency. Other elements of the operating points may also differ between audio and video modes, such as differing operating voltages, etc. Furthermore, in other embodiments, the operating frequency in the audio mode may be higher than the operating frequency in the video mode.

In an embodiment, changing from the audio mode (audio operating point) to the video mode (video operating point) or vice versa may include time for the integrated circuit 12 to stabilize at the new operating point. For example, the PLL 18 may need time to relock to a new operating frequency, if the operating frequency is changed. Particularly, in one embodiment, the video operating frequency may be higher than the audio operating frequency. Thus, changing from audio mode to video mode may include increasing the operating frequency generated from the PLL 18, and allowing the PLL 18 to lock to the higher operating frequency. Additionally or alternatively, the memory controller 36/memory PHY 38/external memory 14 may need to relock to the new operating frequency. For a power supply voltage change, time may be needed to charge or discharge the capacitance in the power supply distribution network within the integrated circuit 12. A power gated block that is being powered on may need time to stabilize after power up. In order to provide for the mode change without losing memory state in the external memory 14, switch code may be executed that may place the external memory 14 in self-refresh mode, among other things. In self-refresh mode, the contents of the external memory 14 are retained (by the external memory automatically refreshing each row of memory cells in a cyclical fashion) but the memory is not accessible until self-refresh mode is exited. Refreshing a row of memory may refer to reading the data in the row and writing it back to the row unmodified, to ensure that the stored state is not lost. In dynamic random access memory (DRAM), for example, leakage of the stored charge in each memory cell may cause loss of the memory contents if refresh is not performed often enough. A row of memory may be a set of cells that are read/written as a unit within the memory.

While the external memory 14 is in the self-refresh mode, the memory controller 36 and memory PHY 38 may be taken offline, and a new operating point may be established for the new mode. The memory controller 36 may be reinitialized, and the memory PHY 38 may lock to the new frequency in the new operating point. The external memory 14 may also lock to a clock having a frequency derived from the new operating frequency, or may be clocked at a frequency that is derived from the new operating frequency The memory controller 36 may then control the interface to the external memory 14 to cause the memory to exit self-refresh mode.

Because the switch code is executed at least partially during the time that the external memory 14 is in self-refresh mode, the switch code may not be fetched from the external memory 14 during execution (also referred to as being "executed from" the external memory 14). The switch code may be stored in the external memory 14 (reference numeral 40), but may be copied into internal memory 22 prior to causing the external memory 14 to enter self-refresh mode. The internal memory 22 is illustrated in FIG. 1 as part of the audio system 20, but may generally be included anywhere in the integrated circuit 12 that is operational in audio mode. The internal memory 22 may be used for other things in audio mode (e.g. as a buffer for audio data that is being processed by the audio system 20), and thus the switch code 40 may be copied to the internal memory 22 when needed to perform the switch to video mode and may be overwritten in the internal memory 22 after the switch is completed.

Accordingly, the processor 24 may be configured to fetch from the internal memory 22. For example, the internal memory 22 may be mapped into the address space of the processor 24 at a defined location, and the processor 24 may be directed to fetch from the address. In one embodiment, the internal memory 22 may also be used during boot of the integrated circuit 12 to store code for initializing various components of the integrated circuit 12. In some embodiments, the L1 and L2 caches accessible to the core 26 may be disabled during the mode switch. In other embodiments, the caches may be enabled. In such embodiments, fetching from the internal memory 22 (or executing out of the internal memory 22) may including hitting in the caches (such that the access to the internal memory 22 may actually be completed in cache and may not be transmitted to the internal memory 22). Similarly, fetching from the external memory 14 (or executing out of the internal memory 14) may include hitting in the caches.

The audio system 20 may include any circuitry configured to perform audio processing (e.g. processing audio data to produce sound to be played on the speakers or other audio output devices and/or processing sound data sampled from an audio input device). For example, the audio system 20 may include one or more digital signal processors (DSPs), hardware encoders/decoders, audio input/output controllers, a DMA interface to the DMA unit 32 for moving data to/from external memory, etc.

As illustrated in FIG. 1, the processor 24 includes the core 26, which may include one or more level 1 (L1) caches and one or more memory management units (MMUs). The MMUs may include one or more translation lookaside buffers caching translation information. The processor 24 may also include a level 2 (L2) cache 28. Generally, any number of caches and various hierarchical arrangements may be employed in various embodiments.

The processor 24 may implement any instruction set architecture, and may be configured to execute instructions in that instruction set architecture. The processor 24 may employ any microarchitecture, including scalar, superscalar, pipelined, superpipelined, out of order, in order, speculative, non-speculative, etc., or combinations thereof. The processor 24 may include circuitry, and optionally may implement microcoding techniques.

The memory controller 36 may be configured to receive memory requests from the system interface unit 30 (which may have received the requests from one or more other components as shown in FIG. 1, such as the processor 24, the peripherals 34A, and/or the DMA unit 32 on behalf of the audio system 20 and/or the other peripherals 34B). The memory controller 36 may access memory to complete the requests (writing received data to the memory for a write request, or providing data from the memory in response to a read request) through the memory PHY 38. The memory controller 36 may be configured to interface with any type of external memory 14, such as dynamic random access memory (DRAM), synchronous DRAM (SDRAM), double data rate (DDR, DDR2, DDR3, etc.) SDRAM (including mobile versions of the SDRAMs such as mDDR3), RAMBUS DRAM (RDRAM), static RAM (SRAM), etc.

The memory PHY 38 may handle the low-level physical interface to the external memory 14. For example, the memory PHY 38 may be responsible for the timing of the signals, for proper clocking to synchronous DRAM memory, etc. In one embodiment, the memory PHY 38 may be configured to lock to a clock supplied from the power manager 16 and may be configured to generate a clock used by the external memory 14.

The external memory 14 may be any type of memory, as mentioned above. In addition to storing the switch code for transfer to the internal memory 22 as needed, the external memory 14 may store additional processor instructions and data (reference numeral 42) for use by the processor 24. The additional instructions 42 may include instructions which are executed by the processor 24 as part of changing from audio mode to video mode (e.g. instructions to copy the switch code 40 to the internal memory 22). The external memory 14 may also store other data (reference numeral 44) such as audio data, video data, or other data for use by various peripherals in the integrated circuit 12.

The system interface unit 30 may be a "top level" interface connecting the various components of the integrated circuit 12 and providing communication therebetween. Any sort of interface may be used (e.g. a bus, a packet interconnect, etc.).

The peripherals 34A-34B may include any desired functionality. The peripherals 34A may include various peripherals that are expected to have higher bandwidth/lower latency requirements that the peripherals 34B. Thus, the peripherals 34A may have a direct connection to the system interface unit 30 in addition to DMA support through the DMA unit 32. Peripherals 34B may have lower bandwidth requirements and therefore may access indirectly through the DMA unit 32.

The peripherals 34A-34B may include various video peripherals such as, for example, one or more display controllers to control a video display. The display controllers may read a frame buffer stored in the external memory 14 that identifies the color that each pixel of the display should show, and may display the image described by the frame buffer on the display. The video peripherals may include one or more video encoders configured to encode video streams using any desired coding scheme. Encoding schemes may include motion picture experts group (MPEG) versions 1-4 or any subsequent version, or any other video compression or coding scheme. Similar, one or more video decoders may be configured to decode video streams that were encoded using any desired coding scheme. The video peripherals may also include mixers, scalers, shaders, etc.

Other peripherals 34A-34B may also include networking peripherals such as one or more networking media access controllers (MAC) such as an Ethernet MAC or wireless fidelity (WiFi) controller. The peripherals 34A-34B may include various interface controllers such as a universal serial bus (USB) controller, a peripheral component interconnect express (PCIe) controller, a flash memory interface, general purpose input/output (I/O) pins, etc. The peripherals 34A-34B may include any other desired functional such as timers, an on-chip secrets memory, an encryption engine, etc., or any combination thereof. One or more photo peripherals may be included such as a camera interface, a joint photographic experts group (JPEG) coder/decoder (codec), The DMA unit 32 may be configured to perform transfers to and from the external memory 14 through the memory controller 36 on behalf of the peripherals 34A-34B and the audio system 20. The DMA unit 32 may be programmable by the processor 24 to perform the DMA operations. For example, the DMA unit 32 may be programmable via descriptors. The descriptors may be data structures stored in the external memory 14 that describe DMA transfers (e.g. source and destination addresses, size, etc.). Alternatively, the DMA unit 32 may be programmable via registers in the DMA unit 32.

It is noted that other embodiments may include other combinations of components, including subsets or supersets of the components shown in FIG. 1 and/or other components. While one instance of a given component may be shown in FIG. 1, other embodiments may include one or more instances of the given component.

Figure 2:
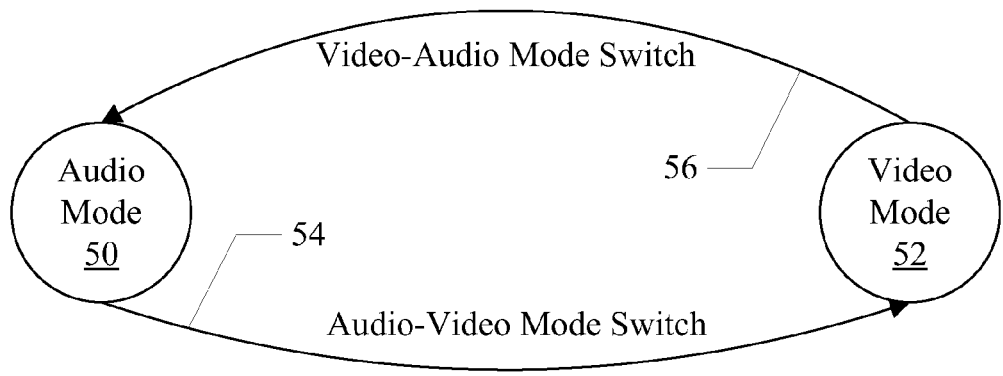
FIG. 2 is a state machine illustrating modes of one embodiment of an integrated circuit.

Turning now to FIG. 2, a state machine is shown illustrating exemplary operating modes in the integrated circuit 12 for one embodiment. The audio mode 50 and the video mode 52 are shown. Other embodiments may have any set of two or more modes that have different operating points and potentially other different characteristics (e.g. different operating voltages and/or frequencies, different power management settings, different components that are active in the mode, etc.).

In the audio mode 50, the audio system 20, the power manager 16, the memory controller 36, the memory PHY 38, and the DMA unit 32 may be active. The processor 24 may be in sleep mode (a low power mode in which code is not executing), but may be awakened via an interrupt. Alternatively, the processor 24 may be active as well. Other embodiments may implement other sets of active components, including subsets and/or supersets of the above components. The operating frequency for audio mode 50 may be different than the operating frequency for video mode 52. The external memory 14 may also be active in audio mode 50, and may be locked (e.g. via the memory PHY 38) to a clock that is oscillating at a frequency derived from the audio operating frequency for audio mode 50.

If a transition from audio mode 50 to video mode 52 is detected, the integrated circuit 12 may implement the audio-video mode switch described above (and illustrated in more detail in FIG. 3, discussed below—arrow 54 in FIG. 2). The transition may be detected due to hardware monitoring of activity in the system, user input to the system indicating that video mode is desired, etc. The audio-video mode switch may include establishing the video operating point.

In the video mode 52, the integrated circuit 12 may generally be fully enabled (e.g. all components may be enabled), although components may be disabled by software, or temporarily disabled due to a lack of activity, etc. If a transition is detected from the video mode 52 to the audio mode 50, the power manager 16 may perform a video-audio mode switch (arrow 56). The video-audio mode switch may include establishing the audio operating point. In one embodiment, the video-audio mode switch may be similar to that shown in FIG. 3. In other embodiments, the video-audio mode switch may be performed without the steps shown in FIG. 3 (e.g. if establishing the audio operating point does not require use of the switch code 40). The transition from video mode 52 to audio mode 50 may be detected in any desired fashion, similar to the discussion above for the transition from audio mode 50 to video mode 52.

It is noted that the audio mode 50, the video mode 52, and the transitions therebetween may be accomplished in software (e.g. instructions executed on the processor 24), hardware, and/or a combination of hardware and software.

Figure 3:
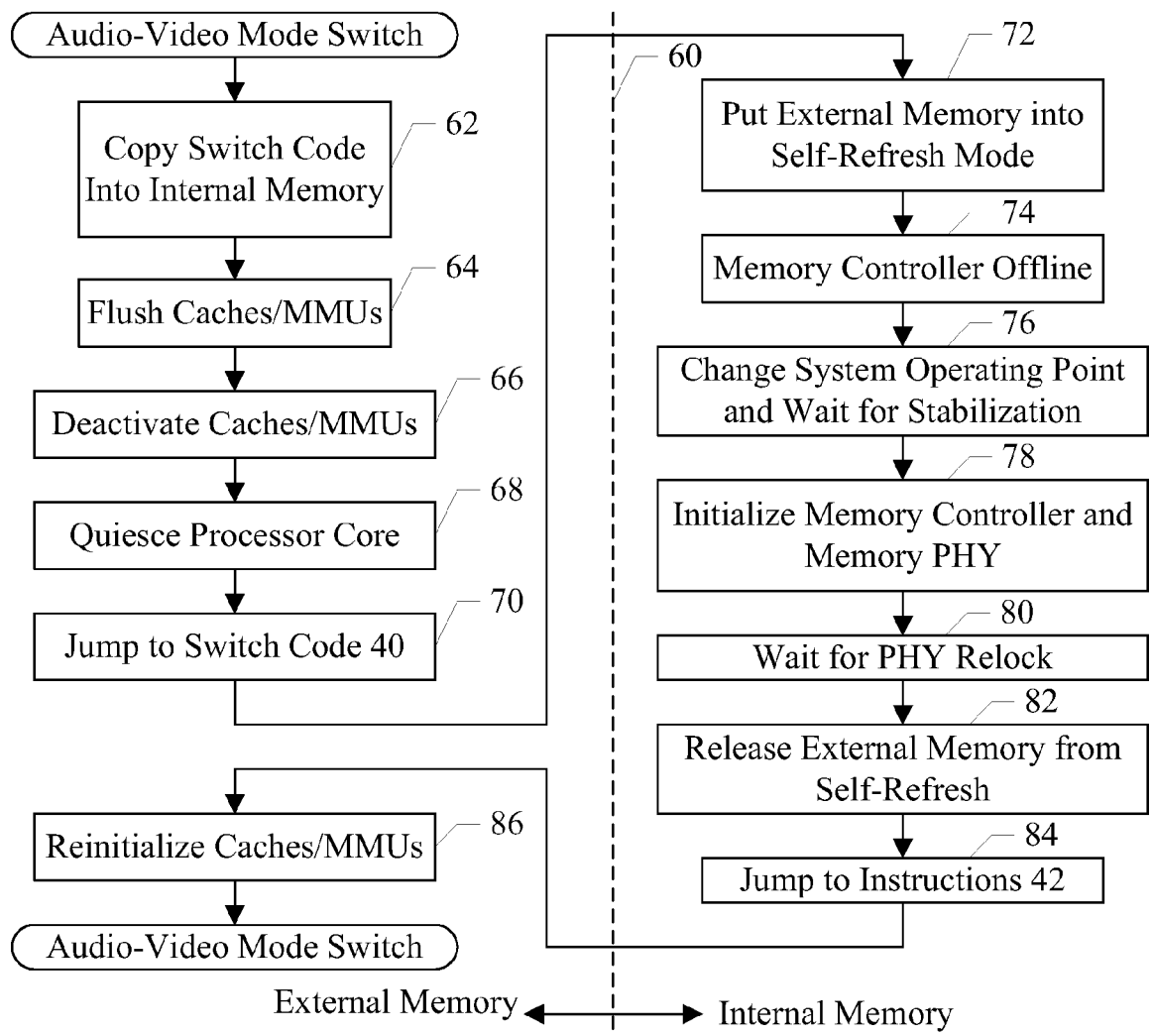
FIG. 3 is a flowchart illustrating one embodiment of switching from a lower frequency mode to a higher frequency mode.

Turning now to FIG. 3, a flowchart is shown illustrating operation of one embodiment of the instructions executed by the processor 24 to switch from audio mode to video mode (arrow 54 in FIG. 2). The switch from video to audio mode may be similar, in some embodiments. While the blocks are shown in a particular order for ease of understanding, other orders may be used. Generally, the instructions executed in the processor 24 may include one or more instructions, which, when executed, implement the operation illustrated in the flowchart of FIG. 3.

The flowchart of FIG. 3 is illustrated in two portions, divided by a vertical dashed line 60. Operations to the left of the line 60 may be implemented in instructions that are stored in the external memory 14 and are executed out of the external memory 14. For example, in FIG. 1, the instructions may be part of the processor instructions/data 42. Operations to the right of the line 60 may be implemented as part of the switch code 40, executed out of the internal memory 22. The switch code 40 may also be stored in the external memory 14, but may be executed out of the internal memory 22. Generally, instructions may be executed out of a given memory if they are fetched from the given memory to the processor 24. The instructions may be found in cache, in some embodiments, but the addresses used to fetch the instructions may be mapped to the given memory.

The flowchart of FIG. 3 begins with instructions 42 executing out of the external memory 14. The switch code 40 may be copied from the external memory 14 to the internal memory 22 (block 62). The copy may be performed in any of a variety of ways. For example, the instructions 42 may include instructions to read the switch code 40 from the external memory 14 and to write the switch code 40 to the internal memory 22. Alternatively, the instructions 42 may include instructions which program the DMA unit 32 to read the switch code 40 from the external memory 14 and write the switch code 40 to the internal memory 22 using a DMA transfer.

The instructions 42 may flush the caches in the processor 24 (e.g. the L1 caches in the core 26 and the L2 cache 28, in FIG. 1), as well as any other caches in the integrated circuit 12 that may store dirty data. The MMUs may also be flushed, e.g. flushing the TLBs (block 64). Flushing the data may cause any modified data to be written back to the source. For example, the external memory 14 may be the source, and the data may be preserved during the mode switch in the external memory 14 in self-refresh mode. The caches and MMUs may optionally be deactivated (block 66), and the core 26 of the processor core 24 may be quiesced to ensure that previous instruction execution and the effects thereof are complete (block 68). Quiescing the processor core 24 may include disabling interrupts to the processor core 24. It is noted that some or all of the operation of blocks 64, 66, and 68 may be implemented in the switch code 20, in other embodiments.

The instructions 42 may jump to the switch code 40 in the internal memory 22 (block 70). Generally, a jump may refer to a control flow instruction which causes instruction fetching to continue at a different address than the next sequential address to the control flow instruction. For example, in the case of block 70, the control flow instruction may jump to the first instruction in the switch code 40, at the address of that instruction in the internal memory 22. The control flow instruction may be a branch instruction. In some instruction sets, a branch with link or a call instruction may be used, in which case the address of the control flow instruction or the next sequential address may be saved for use by a branch to link instruction or return instruction to return to the jump point. The jump may also include one or more instructions to calculate the target address of the jump.

The switch code 40 may put the external memory 14 into self-refresh mode (block 72). For example, the switch code 40 may include one or more instructions which transmit a command to the memory controller 36 to cause the memory controller 36 (through the memory PHY 38) to transmit a self-refresh command to the external memory 14. The switch code 40 may include further instructions to take the memory controller 36 offline (block 74). Alternatively, the memory controller 36 may automatically be offline in response to the command to enter self-refresh mode. When offline, the memory controller 36 may not accept memory requests, or may accept them and enqueue them but take no further action. The switch code 40 may include instructions to communicate with the power manager 16 to change the operating point of the system, and may wait for the integrated circuit 12 to stabilize at the new operating point (block 76). The wait may be for a specified period of time within which the Is integrated circuit 12 is guaranteed to be stable, or until a signal is provided from the power manager 16 indicating that stabilization has been achieved. For example, in one embodiment, the video operating point may include a video operating frequency that is higher than the audio operating frequency that is included in the audio operating point. The switch code 40 may communicate with the power manager 16 in an audio-video mode switch to increase the operating frequency of the clocks generated by the PLL 18 to the video operating frequency (or frequencies derived from the video operating frequency). The wait may include time for the PLL 18 to lock to the video operating frequency. The switch code 40 may initialize the memory controller 36 and memory PHY 38 to the new operating point (block 78), and may wait for the PHY relock (block 80). Again, the wait may be for a specified period of time or until the memory PHY 38 signals that it is relocked. The switch code 40 may reactivate the external memory 14, releasing the external memory from self-refresh mode (block 82). That is, the switch code 40 may transmit a command to the memory controller 36 to exit self-refresh and reactivate for access. The memory controller 36 may communicate through the memory PHY 38 to reactivate the external memory 14. Since the external memory 14 has been in self-refresh mode, the contents of the external memory 14 are still valid. The switch code 40 may include a jump to the instructions 42 (block 84), resuming execution from the external memory. The instructions 42 may reinitialize the caches and MMUs of the processor 26 (block 86). Alternatively, the reinitialization of block 86 may be part of the switch code 40. After reinitialization, the transition to video mode is complete. The instructions 42 may continue with enabling various components that were disabled, etc., and may return to normal operation.

The switch code 40 may be copied into the internal memory 22 each time the audio-video mode switch is to occur, in this embodiment. The internal memory 22 has other uses (e.g. to store audio data being processed by the audio system 20), and thus it may be desirable to overwrite the switch code 40 in the internal memory 22 when it is not in use transitioning from audio mode 50 to video mode 52.

Figure 4:
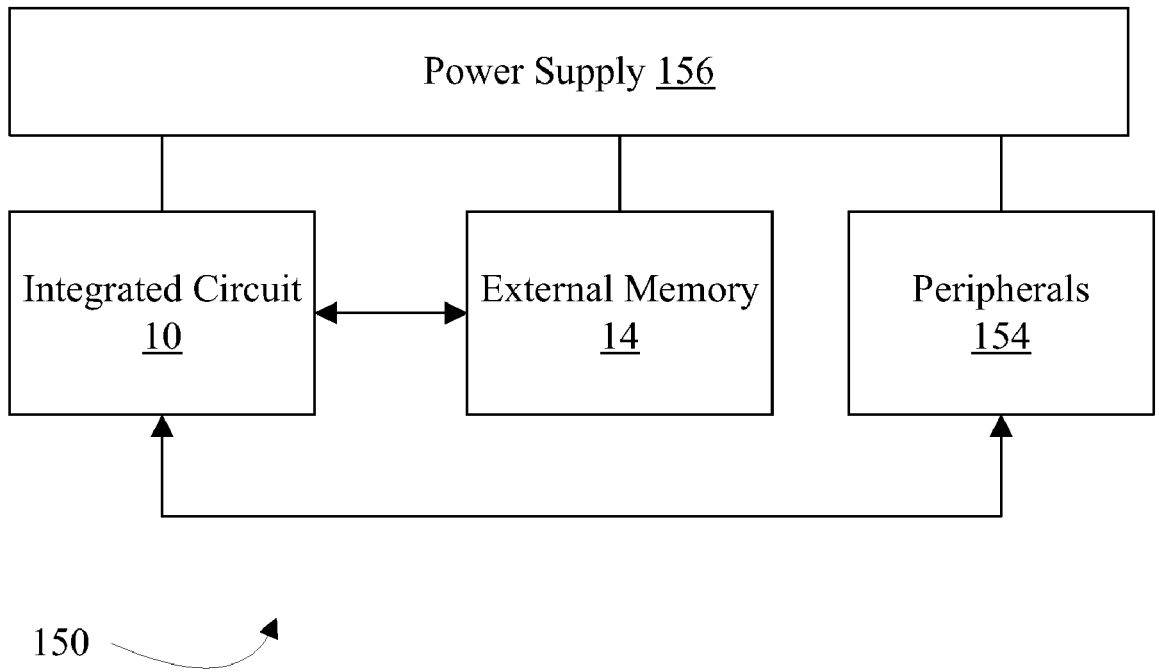
FIG. 4 is a block diagram of another embodiment of a system.

Turning next to FIG. 4, a block diagram of one embodiment of a system 150 is shown. The system 150 may be another embodiment of the system 10 illustrated in FIG. 1. In the illustrated embodiment, the system 150 includes at least one instance of the integrated circuit 10 coupled to one or more peripherals 154 and the external memory 14. A power supply 156 is also provided which supplies the supply voltages to the integrated circuit 10 as well as one or more supply voltages to the memory 14 and/or the peripherals 154. In some embodiments, more than one instance of the integrated circuit 10 may be included (and more than one external memory 14 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

Figure 5:
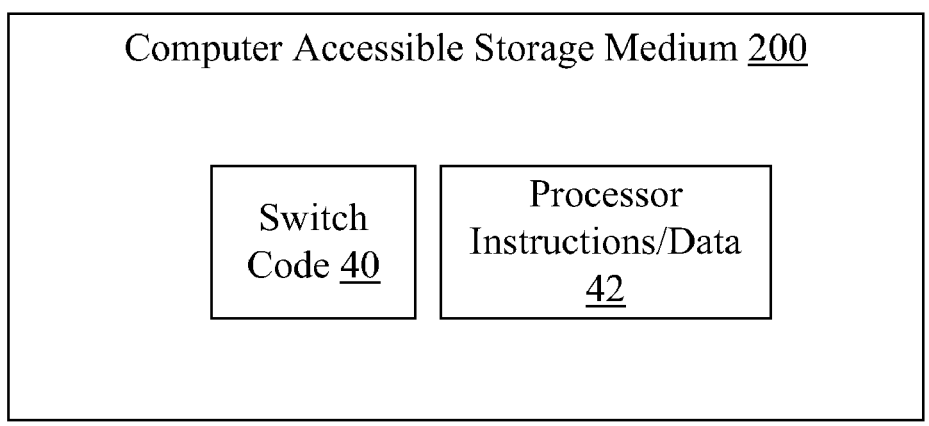
FIG. 5 is a block diagram of one embodiment of a computer accessible storage medium.

Turning now to FIG. 5, a block diagram of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, the serial peripheral interface (SPI), the flash memory interface (FMI), etc. Storage media may include microelectromechanical systems (MEMS), as well as storage media accessible via a communication medium such as a network and/or a wireless link. The computer accessible storage medium 200 in FIG. 5 may store one or more of switch code 40 and/or the processor instructions/data 42. Generally, the computer accessible storage medium 200 may store any set of instructions which, when executed, implement a portion or all of the operation shown in FIGS. 2 and 3. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A method, in an integrated circuit that includes a processor, an internal memory, and a memory controller coupled to an external memory that is outside of the integrated circuit, the method comprising:
   the processor executing code in the internal memory in response to a determination that a new operating point is to be established for the integrated circuit;
   the processor communicating with the memory controller to place the external memory in a self-refresh mode, the processor communicating responsive to executing the code in the internal memory;
   altering the operating point of the integrated circuit to the new operating point from a current operating point; and
   the processor releasing the external memory from the self-refresh mode.

2. The method as recited in claim 1 further comprising, prior to executing the code in the internal memory, copying the code into the internal memory from the external memory.

3. The method as recited in claim 2 further comprising, prior to executing the code in the internal memory, the processor flushing one or more caches to the external memory.

4. The method as recited in claim 3 further comprising, prior to executing the code in the internal memory, the processor deactivating the caches and one or more memory management unit memories.

5. The method as recited in claim 1 further comprising waiting for a physical interface circuit to the external memory to relock subsequent to reinitializing the memory controller.

6. The method as recited in claim 5 further comprising the processor reinitializing the memory controller and the processor executing code in the external memory subsequent to reinitializing the memory controller.

7. A computer accessible storage medium storing a plurality of instructions which, when executed on a processor in an integrated circuit that also includes an internal memory and a memory controller coupled to an external memory that is outside of the integrated circuit:
   determine that a new operating point is to be established for the integrated circuit;
   responsive to determining that the new operating point is to be established, copy a subset of the plurality of instructions into the internal memory; and
   jump to the subset in the internal memory.

8. The computer accessible storage medium as recited in claim 7 wherein the subset in the internal memory include instructions which, when executed on the processor, communicate with the memory controller to place the external memory in a self-refresh mode.

9. The computer accessible storage medium as recited in claim 7 wherein the subset includes instructions which, when executed on the processor subsequent to establishing the new operating point, release the external memory from the self-refresh mode.

10. The computer accessible storage medium as recited in claim 9 wherein the subset further comprises instructions to initialize the memory controller and to wait for a physical interface circuit to the external memory to relock subsequent to initializing the memory controller.

11. The computer accessible storage medium as recited in claim 9 wherein the subset includes at least one instruction to jump to instructions in the external memory.

12. The computer accessible storage medium as recited in claim 7 further comprising instructions executed by the processor prior to jumping to the code in the internal memory to flush one or more caches to the external memory.

13. A method comprising:
   in an audio mode in an integrated circuit, detecting that a transition to video mode is to occur;
   storing code in an internal memory within the integrated circuit responsive to detecting that the transition is to occur; and
   executing the code to cause an external memory to enter self-refresh mode;
   altering an operating point from a current operating point used in audio mode to a different operating point used in video mode.

14. The method as recited in claim 13 further comprising taking a memory controller offline subsequent to the external memory entering self-refresh mode, the memory controller within the integrated circuit and coupled to the external memory.

15. The method as recited in claim 14 further comprising initializing the memory controller subsequent to altering the operating point of the integrated circuit and the integrated circuit stabilizing at the different operating point.

16. The method as recited in claim 15 wherein initializing the memory controller comprises relocking a physical interface circuit of the memory controller to an operating frequency associated with the different operating point.

17. The method as recited in claim 13 further comprising causing the external memory to exit the self-refresh mode subsequent to altering the operating point of the integrated circuit and the integrated circuit stabilizing at the different operating point.

18. A system comprising:
   an integrated circuit comprising a processor, an internal memory, and a memory controller; and
   an external memory coupled to the memory controller in the integrated circuit, wherein the external memory is configured to store a plurality of instructions during use, and wherein the processor is configured to fetch instructions from the external memory and executing the instructions, and wherein the plurality of instructions, when executed by the processor, copy switch code into the internal memory in response to detecting a transition from an audio mode of the system to a video mode and jump to the switch code to perform at least a portion of the transition.

19. The system as recited in claim 18 wherein the switch code includes instructions which, when executed by the processor, communicate with the memory controller to cause the external memory to enter self refresh mode.

20. The system as recited in claim 19 wherein the switch code includes instructions to detect that a physical interface circuit of the memory controller has locked to an operating frequency for video mode.

21. The system as recited in claim 20 wherein the switch code includes instructions which, when executed by the processor, cause the external memory to exit self-refresh mode responsive to the physical interface circuit having locked to the operating frequency.

22. The system as recited in claim 18 wherein the instruction executed prior to jumping to the switch code are configured to cause one or more caches in the integrated circuit to flush to memory.

* * * * *